United States Patent
Schupp et al.

(10) Patent No.: US 7,262,284 B2
(45) Date of Patent: Aug. 28, 2007

(54) METHOD FOR PRODUCING DISAZO PIGMENTS

(75) Inventors: Olaf Schupp, Frankfurt am Main (DE); Felix W. Grimm, Hofheim (DE); Manfred Opravil, Karben (DE); Joachim Weber, Frankfurt am Main (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 335 days.

(21) Appl. No.: 10/519,218

(22) PCT Filed: May 27, 2003

(86) PCT No.: PCT/EP03/05520

§ 371 (c)(1),
(2), (4) Date: Dec. 17, 2004

(87) PCT Pub. No.: WO04/000947

PCT Pub. Date: Dec. 31, 2003

(65) Prior Publication Data

US 2006/0167236 A1    Jul. 27, 2006

(30) Foreign Application Priority Data

Jun. 20, 2002   (DE) ................. 102 27 527

(51) Int. Cl.
*C09B 33/153*   (2006.01)
(52) U.S. Cl. ............... 534/740; 534/575; 534/741; 534/887

(58) Field of Classification Search ................. 534/740, 534/741, 575, 588, 887
See application file for complete search history.

(56) References Cited

U.S. PATENT DOCUMENTS

| 3,956,266 | A | | 5/1976 | Mory et al. |
| 3,991,044 | A | * | 11/1976 | Conley ............... 534/575 |
| 5,030,247 | A | | 7/1991 | Goldmann |
| 5,428,136 | A | | 6/1995 | Jung et al. |
| 5,559,216 | A | | 9/1996 | Jung et al. |
| 5,560,760 | A | | 10/1996 | Toeppen |
| 6,207,809 | B1 | | 3/2001 | Nesler |
| 6,504,045 | B2 | | 1/2003 | Jung et al. |

FOREIGN PATENT DOCUMENTS

| DE | 2329781 | 1/1975 |
| DE | 2451097 | 5/1975 |
| DE | 4225295 | 2/1994 |
| DE | 4229207 | 3/1994 |
| FR | 2237937 | 2/1975 |
| GB | 1472137 | 5/1977 |

OTHER PUBLICATIONS

PCT ISR for PCT/EP03/05520, mailed Aug. 10, 2003.
English Translation of PCT IPER for PCT/EP 03/05520, mailed Apr. 28, 2005.
U.S. Appl. No. 10/479,344; by Weber et al., filed May 12, 2006.

* cited by examiner

*Primary Examiner*—Fiona T. Powers
(74) *Attorney, Agent, or Firm*—Anthony A. Bisulca

(57) ABSTRACT

A method for the production of a diazo pigment, or a mixture of diazo pigments, according to formula (I) of the specification by azo coupling, wherein the azo coupling product is subjected to a finish in an organic solvent or in an aqueous organic solvent with a neutral or alkaline pH.

20 Claims, No Drawings

METHOD FOR PRODUCING DISAZO PIGMENTS

The present invention relates to a new process for preparing disazo pigments with heterocyclic bases as a diazo component.

Some disazo pigments are obtained in their synthesis as such finely divided prepigments that in the course of drying they undergo sintering to become harsh-textured and coarsely particulate powders which can no longer be satisfactorily dispersed. In order to bring them into a form useful for application the fine particles must be subjected, by means of a finish, to an operation of crystal growth.

DE-A-24 51 097 discloses disazo pigments with heterocyclic bases as a diazo component and a process for preparing these disazo pigments.

DE-A-23 29 781 discloses disazo pigments with aminobenzoxazinediones as a diazo component. Pigments of this class have low color strengths.

DE-A-42 25 295 discloses disazo pigments with aminophenylbenzothiazole as a diazo component. Pigments of this class lack sufficient light fastness.

DE-A-42 29 207 discloses a process for preparing disazo pigments which comprises using a surfactant having a cloud point. The use of the pigments prepared in accordance with that invention is restricted to the printing inks utility.

When pigments are used for coloring organic materials of high molecular mass the requirements imposed on the performance properties of the pigments are exacting, and include high color strength; good light fastness and weather fastness; in the case of use in paint systems, excellent overcoating fastnesses, high gloss, low viscosity of the highly pigmented paint concentrates (millbase) and of the ready-to-use paints, and, particularly in the case of metallic finishes, high transparency and brilliant hues. In the case of the coloring of plastics there is a particular requirement, in addition to the coloristics and fastness properties, such as bleed fastness, for ready dispersibility. In printing systems the critical factors include high color strengths and gloss. The pigments should as far as possible be able to be used universally.

The disazo pigments prepared by the known processes and having heterocyclic bases as a diazo component in some cases do not meet the present-day requirements and in some cases lack universal utility.

There existed a need for improvement, and hence the object of finding a process for preparing disazo pigments with heterocyclic bases that provides pigments which meet the present-day requirements and whose use is not restricted to a single field of application.

It has been found that the object is achieved, surprisingly, by means of a finish in aqueous-organic solvent at neutral or alkali pH or in organic solvent at alkali pH.

The invention provides a process for preparing disazo pigments of the formula (I)

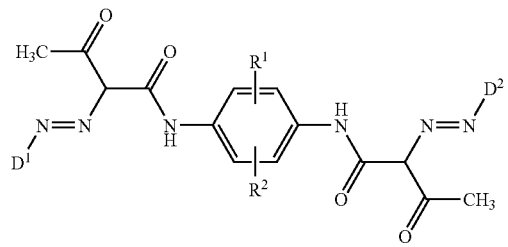

or a mixture of said disazo pigments by azo coupling, where $R^1$ and $R^2$ are identical or different and are hydrogen, $C_1$-$C_4$ alkyl, $C_1$-$C_4$ alkoxy, $C_1$-$C_5$ alkoxycarbonyl, nitro, cyano, halogen, phenoxy or trifluoromethyl;

$D^1$ and $D^2$ are identical or different and are an aromatic heterocycle from the group consisting of benzimidazole, benzimidazolone, benzimidazolethione, benzoxazole, benzoxazolone, benzothiazolone, indazole, phthalimide, naphthalimide, benzotriazole, quinoline, benzodiazines, phenmorpholine, phenmorpholinone, benzo[c,d]indolone, benzimidazo[1,2-a]pyrimidone, carbazole and indole, said heterocycles being unsubstituted or substituted by 1, 2, 3 or 4 identical or different radicals from the group consisting of halogen, $C_1$-$C_4$ alkyl, acetamido, carbomethoxyamino, $C_1$-$C_4$ alkoxy, nitro, phenyl, phenoxy or trifluoromethyl, it being possible for the phenyl radical to be substituted by chloro, methyl or methoxy, and said heterocycle being attached directly or via a phenylene group to the azo group in formula (I), which comprises subjecting the azo coupling product to a finish in organic solvent at alkaline pH or in aqueous-organic solvent at neutral or alkaline pH.

Preferably $R^1$ and $R^2$ are identical or different and are hydrogen, methyl, ethyl, methoxy, ethoxy, propoxy, butoxy, fluoro, chloro, bromo, cyano, nitro, methoxycarbonyl, ethoxycarbonyl or trifluoromethyl.

Preferred aromatic heterocycles are those from the group consisting of benzimidazolone, phthalimide, naphthalimide and benzodiazines, such as quinazoline, quinazolinone, quinazolinedione, phthalazine, phthalazinone, phthalazinedione, quinoxaline, quinoxalinone and quinoxalinedione.

Preferably the heterocycles $D^1$ and $D^2$ are unsubstituted or substituted by 1, 2 or 3 identical or different radicals from the group consisting of methyl, ethyl, methoxy, ethoxy, nitro, fluoro, chloro, bromo, phenyl and trifluoromethyl. The formula (I) is to be understood as an idealized formula and also embraces the corresponding tautomeric compounds and also the possible configurational isomers of each tautomeric form. Thus in the rings of $D^1$ and $D^2$, for example, —NH—CO— moieties may also be present in different tautomeric forms. The disazo pigments of formula (I) are normally in the hydrazone form. The formula (I) therefore also embraces the bishydrazone form in particular.

The coupling product is prepared by azo coupling one or more diazotized amines of the formula D-NH$_2$, in which D has the abovementioned definition of $D^1$ or $D^2$, advantageously with from 0.45 mol to 0.55 mol, preferably from 0.5 to 0.53 mol, per mole of the total diazonium salts to be converted, of one or more coupling components of the formula (III)

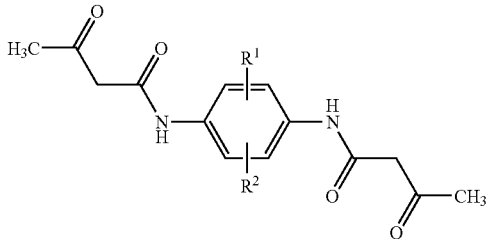

(III)

in which $R^1$ and $R^2$ are as defined above.

Preference is given to using coupling products prepared by coupling only one diazotized amine of the formula $D-NH_2$, to give pigments of formula (I) in which $D^1$ and $D^2$ have the same definition.

Use is made in particular of coupling products prepared by coupling only one diazotized amine of the formula $D-NH_2$ with only one coupling component of the formula (IV)

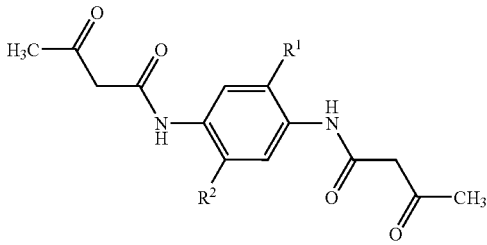

(IV)

where $R^1$ and $R^2$ are identical or different and are hydrogen, methyl, methoxy, chloro or trifluoromethyl, to give pigments of the formula (I) in which $D^1$ and $D^2$ have the same definition.

Examples of amines of the formula $D-NH_2$ are heterocyclic amines from the group consisting of benzimidazole, benzimidazolone, benzimidazolthione, benzoxazole, benzoxazolone, benzothiazolone, indazole, phthalimide, naphthalimide, benzotriazole, quinoline, benzodiazines, such as quinazoline, quinazolinone, quinazolinedione, phthalazine, phthalazinone, phthalazinedione, quinoxaline, quinoxalinone and quinoxalinedione, phenmorpholine, phenmorpholinone, benzo[c,d]indolone, benzimidazo[1,2-a]pyrimidone, carbazole and indole, it being possible for the heterocycles to be unsubstituted or substituted by the radicals listed above, examples being 4-amino-6-chlorobenzimidazole, 4-amino-6-chloro-2-methylbenzimidazole, 5-amino-2-acetamidobenzimidazole, 5-amino-2-carbomethoxyaminobenzimidazole, 5-aminobenzimidazol-2-one, which may be substituted in position 6 by methyl, ethyl, methoxy, ethoxy, nitro, fluoro, chloro, bromo or trifluoromethyl; 5-aminobenzimidazol-2-one, which may be substituted in position 7 by methyl, ethyl, methoxy, ethoxy, nitro, fluoro, chloro, bromo or trifluoromethyl; 5-amino-1-methylbenzimidazol-2-one, 5-amino-1-p-chlorophenylbenzimidazol-2-one, 5-amino-1-p-methoxyphenylbenzimidazol-2-one, 5-amino-1-ethylbenzimidazol-2-one, 5-amino-3-methylbenzimidazol-2-one, 5-amino-4,6-dichlorobenzimidazol-2-one, 5-amino-4,6,7-trichlorobenzimidazol-2-one, 6-amino-4-chloro-5-nitrobenzimidazol-2-one, 7-amino-5-chloro-1-methylbenzimidazol-2-one, 5-amino-6-methylbenzimidazol-2-thione; 5-amino-7-chlorobenzoxazol-2-one, 6-amino-5-chlorobenzoxazol-2-one; 6-aminobenzothiazol-2-one; 3-amino-6-chloroindazole, 5-aminoindazole, 6-aminoindazole, 5-aminophthalimide, 3-amino-1,8-naphthalimide, 5-amino-2-(2-hydroxyphenyl)benzotriazole, 6-amino-2-hydroxy-4-methylquinoline, which may be further substituted by 5-methyl, 7-chloro, 7-methyl, 7-ethoxy, 8-methyl or 8-methoxy, especially 6-amino-5-chloro-4,8-dimethyl-2-hydroxyquinoline, 6-amino-8-chloro-4,5-dimethyl-2-hydroxyquinoline, 6-amino-5,8-dimethoxy-4-methyl-2-hydroxyquinoline, 6-amino-5-chloro-4-methyl-8-methoxy-2-hydroxyquinoline, 6-amino-4,5,8-trimethyl-2-hydroxyquinoline and 6-amino-5,8-dimethyl-2-hydroxyquinoline; 7-aminoquinoline, 7-amino-2-hydroxyquinoline, 7-amino-2-hydroxy-4-methylquinoline which may be additionally substituted by 6-nitro, 6-methoxy, 6-isopropoxy, 6-butoxy, 6-methyl or 6-chloro, 5-chloro or 5-methyl, especially 7-amino-2-hydroxy-4-methylquinoline and 7-amino-2-hydroxy-4-methyl-6-methoxyquinoline; 6-amino-2-methylquinazolin-4-one, 6-amino-7-chloro-2-methylquinazolin-4-one, 6-amino-2(4'-methoxyphenyl)quinazolin-4-one, 2-(4'-amino-3'-chlorophenyl)quinazolin-4-one; 6-amino-8-chlorophenmorpholin-3-one; 7-amino-6-methylphenmorpholin-3-one; 6-aminoquinazoline-2,4-dione, 6-amino-3-methylquinazolin-2,4-dione, 6-amino-7-nitroquinazoline-2,4-dione, 6-amino-7-chloroquinazoline-2, 4-dione, 6-amino-8-nitroquinazoline-2,4-dione, 7-aminoquinazoline-2,4-dione and 7-amino-6-nitroquinazoline-2,4-dione; 6-aminophthalazin-1,4-dione; 6-aminoquinoxaline-2,3-dione optionally substituted in position 7 by methyl, ethyl, methoxy, ethoxy, nitro, fluoro, chloro, bromo or trifluoromethyl, especially 6-amino-5,7-dichlorquinoxaline-2,3-dione and 6-amino-5,7,8-trichloroquinoxaline-2,3-dione, 7-amino-5-chloroquinoxaline-2,3-dione and 8-amino-6-chloro-1-methylquinoxaline-2,3-dione; 3-aminocarbazole, 3-amino-N-ethylcarbazole, and also aminobenzo[c,d]indol-2-one, and 7- and 8-amino-4-methylbenzimidazo[1,2-a]pyrimid-2-one.

Particularly preferred examples of amines of the formula $D-NH_2$ are 5-aminobenzimidazol-2-one which may be further substituted in position 6 by methyl, methoxy, chloro nitro or trifluoromethyl and further substituted in position 1 and/or 3 by methyl or ethyl; 6-aminoquinoxaline-2,3-dione which may be further substituted in position 7 by methyl, methoxy, chloro, nitro or trifluoromethyl and in position 1 and/or 4 by methyl or ethyl, 6-aminoquinazoline-2,4-dione which may be further substituted in position 7 by methyl, methoxy, chloro, nitro or trifluoromethyl and in position 1 and/or 3 by methyl or ethyl.

Examples of coupling components are 1,4-bis(acetoacetylamino)benzene, 2-fluoro-1,4-bis(acetoacetylamino)benzene, 2-chloro-1,4-bis(acetoacetylamino)-benzene, 2-bromo-1,4-bis(acetoacetylamino)benzene, 2-trifluormethyl-1,4-bis(acetoacetylamino)benzene, 2-cyano-1,4-bis (acetoacetylamino)benzene, 2-methyl-1,4-bis(acetoacetylamino)benzene, 2-methoxy-1,4-bis(acetoacetylamino) benzene, 2-ethoxy-1,4-bis(acetoacetylamino)benzene, 2-phenoxy-1,4-bis(acetoacetylamino)benzene, 2-nitro-1,4-bis(acetoacetylamino)-benzene, 2,5-dichloro-1,4-bis(acetoacetylamino)benzene, 2,5-dimethyl-1,4-bis(acetoacetylamino)benzene, 2,5-dimethoxy-1,4-bis(acetoacetylamino) benzene, 2, 5-diethoxy-1,4-bis(acetoacetylamino)benzene, 2-ethoxy-5-methoxy-1,4-bis(acetoacetylamino)benzene, 2-chloro-5-methyl-1,4-bis(acetoacetylamino)-benzene, 2-chloro-5-methoxy-1,4-bis(acetoacetylamino)benzene, 2-chloro-5-ethoxy-1,4-bis(acetoacetylamino)benzene, 2-methyl-5-methoxy-1,4-bis(acetoacetylamino)-benzene and 2-methyl-5-ethoxy-1,4-bis(acetoacetylamino)-benzene.

Particularly preferred coupling components are 1,4-bis(acetoacetylamino)benzene, 2-methyl-1,4-bis(acetoacetylamino)benzene, 2,5-dimethyl-1,4-bis(acetoacetylamino) benzene, 2-chloro-1,4-bis(acetoacetylamino)benzene, 2,5-dichloro-1,4-bis(acetoacetylamino)benzene, 2-chloro-5-methyl-1,4-bis(acetoacetylamino)benzene, 2-trifluoromethyl-1,4-bis(acetoacetylamino)-benzene and 2-methoxy-1,4-bis(acetoacetylamino)benzene.

The coupling product can be prepared by one of the customary methods, as for example in aqueous medium by means of an azo coupling reaction, by
   a) adding the diazonium salt to the coupling component (direct coupling) or
   b) adding the coupling component to the diazonium salt (indirect coupling), or
   c) else the diazonium salt and the coupling component can be mixed with one another by means of a mixing nozzle, a microreactor or a microjet reactor, by feeding them in simultaneously and continuously.

Both the diazonium salt and the coupling component can be used in the form of a solution or suspension; in the case of indirect coupling the addition of the coupling component in solid form is also customary.

The coupling component is preferably added in the form of a freshly precipitated suspension to the diazonium salt in solution or suspension form.

It can be advantageous to carry out coupling in the presence of common agents which promote coupling, such as long-chain amine oxides and phosphine oxides, for example. Through the choice of suitable coupling methods and coupling parameters and where appropriate through the addition of an agent which promotes coupling it is possible to optimize the conversion to give the desired disazo coupling product and to minimize the formation of mono coupling products. Couplings in aqueous-organic solvents or purely organic solvents may also be employed for preparing the coupling products.

The process parameters critical in azo coupling, such as time, temperature, pH, use of buffers, solvents or surfactants, are known to the skilled worker from the literature. Customary pH values are from 2 to 10. Customary temperatures are from 0 to 75° C.

The coupling product used in the process of the invention can be used either in the form of a presscake, preferably an aqueously moist presscake, or in a dried state, in the form of granules or powder, for example.

In the process of the invention the finish of the coupling product is preferably carried out in a suspension containing from 1 to 50% by weight, preferably from 2 to 20% by weight, more preferably from 3 to 17.5% by weight of the coupling product, based on the total weight of the suspension. Larger amounts of solvent can be used, but this may become uneconomic. In the case of smaller amounts of solvent the mixture's stirrability may be impaired.

Suitable organic solvents for the finish include alcohols having 1 to 20, especially 1 to 10 carbon atoms, such as methanol, ethanol, n-propanol, isopropanol, butanols, such as n-butanol, isobutanol and tert-butanol, pentanols, such as n-pentanol, 2-methyl-2-butanol, hexanols, such as 2-methyl-2-pentanol, 3-methyl-3-pentanol, 2-methyl-2-hexanol, 3-ethyl-3-pentanol, octanols, such as 2,4,4-trimethyl-2-pentanol, cyclohexanol; or glycols, such as ethylene glycol, diethylene glycol, propylene glycol, dipropylene glycol, or glycerol; polyglycols, such as polyethylene glycols or polypropylene glycols; ether, such as methyl isobutyl ether, tetrahydrofuran, dimethoxyethane or dioxane; glycol ethers, such as monoalkyl ethers of ethylene glycol or of propylene glycol or diethylene glycol monoalkyl ethers, in which alkyl may be methyl, ethyl, propyl, and butyl, butyl glycols or methoxybutanol; polyethylene glycol monomethyl ethers, especially those having a mean molar mass of from 350 to 550 g/mol, and polyethylene glycol dimethyl ethers, especially those having a mean molar mass of from 250 to 500 g/mol; ketones, such as acetone, diethyl ketone, methyl isobutyl ketone, methyl ethyl ketone or cyclohexanone; aliphatic acid amides, such as formamide, dimethylformamide, N-methylacetamide or N,N-dimethylacetamide; urea derivatives, such as tetramethyl urea; or cyclic carboxamides, such as N-methylpyrrolidone, valerolactam or caprolactam; esters, such as carboxylic acid $C_1$-$C_6$-alkyl esters, such as butyl formate, ethyl acetate or propyl propionate; or carboxylic acid $C_1$-$C_6$-glycol esters; or glycol ether acetates, such as 1-methoxy-2-propyl acetate; or phthalic or benzoic acid $C_1$-$C_6$-alkyl esters, such as ethyl benzoate; cyclic esters, such as caprolactone; nitriles, such as acetonitrile or benzonitrile; aliphatic or aromatic hydrocarbons, such as cyclohexane or benzene; or alkyl-, alkoxy-, nitro- or halo-substituted benzene, such as toluene, xylenes, ethylbenzene, anisole, nitrobenzene, chlorobenzene, o-dichlorobenzene, 1,2,4-trichlorobenzene or bromobenzene; or other substituted aromatics, such as benzoic acid or phenol; aromatic heterocycles, such as pyridine, morpholine, picoline or quinoline; and also hexamethylphosphoramide, 1,3-dimethyl-2-imidazolidinone; sulfones and sulfoxides, such as dimethyl sulfoxide and sulfolane; and also mixtures of these solvents. When making the selection it should be ensured that the solvent is stable under the chosen conditions.

In the case of an aqueous-organic solvent it is advantageous for at least 2.5% by weight, preferably at least 5% by weight and in particular at least 7.5% by weight of the liquid phase to be organic solvent. Particularly preferred solvents are $C_1$-$C_6$ alcohols, especially methanol, ethanol, isopropanol, isobutanol and tert-butanol and tert-amyl alcohol, or butyl glycol, dimethylformamide, N,N-dimethylacetamide, N-methylpyrrolidone or dimethyl sulfoxide.

Preference is given to an aqueous-organic solvent containing from 2.5 to 95% by weight, preferably from 5 to 90% by weight, and in particular from 7.5 to 75% by weight of organic solvent, based on the total weight of the liquid phase.

In the process of the invention the establishment of an alkali pH brings about a change in the tautomeric form of the coupling product; alternatively, depending on the amount of base and on the nature of the liquid phase, there may also be single or even multiple deprotonation of the coupling product, with formation of salt. Both are generally visible through a change in color.

In order to establish an alkaline pH use is made of bases comprising alkali metal hydroxides, where appropriate in the form of their aqueous solutions, such as sodium hydroxide or potassium hydroxide, or alkali metal alkoxides, where alkali is sodium or potassium in particular and the alkoxide is derived preferably from $C_1$-$C_6$ alcohols, such as, for example, sodium or potassium methoxide, ethoxide, isopropoxide, tert-butoxide and tert-pentoxide. The alkali metal alkoxides may also be prepared in situ by reacting the corresponding alcohol with the alkali metal, alkali metal hydride or alkali metal amide.

The amount of base used may vary within wide ranges. The change in the tautomeric form takes place generally at a pH$>=9$, preferably greater than 9.5, particularly greater than 10.5, very particularly greater than 11.0, and the amount of base must be selected accordingly. For salt formation the base can also be used in larger amounts: for example, from 0.5 to 20 mol, preferably from 0.5 to 15 mol, in particular from 0.5 to 10 mol, based on 1 mol of the pigment. A finish at even higher concentrations of base is also possible, as for example in base at a concentration of up to 20% by weight, preferably up to 15% by weight, based on the total weight of the liquid phase.

It is preferred to choose an aqueous-organic medium at neutral or alkaline pH.

The finish in the process of the invention is carried out preferably at a temperature of from 0 to 250° C., particularly from 15 to 200° C., in particular from 50 to 190° C., for a time of from 5 minutes to 96 hours, particularly from 5 minutes to 48 hours, in particular from 5 minutes to 24 hours, under elevated pressure where appropriate.

If the finish is carried out at alkaline pH it is advantageous to lower the pH again before the pigment is isolated, by adding acid. Suitable acids include organic acids, such as aliphatic or aromatic carboxylic or sulfonic acids, examples being formic acid, acetic acid, propionic acid, butyric acid, hexanoic acid, oxalic acid, citric acid, benzoic acid, phenylacetic acid, benzenesulfonic acid and p-toluenesulfonic acid, and inorganic acids, such as hydrochloric acid, sulfuric acid or phosphoric acid, for example.

It is preferred to carry out neutralization until an acidic pH is reached, although in principle it is enough to reverse the change in tautomeric form or deprotonation which has occurred as a result of adding base.

The pigments are normally isolated by filtration. Before the pigment is isolated, any solvent used can be removed by distillation, under reduced pressure where appropriate, or else by steam distillation.

The pigment prepared by the process of the invention can be employed in the form of preferably aqueous presscakes, but in general comprise solid systems of free-flowing, pulverulent nature, or granules.

To improve the coloristic properties and in order to obtain particular performance effects it is possible to use auxiliaries such as, for example, surfactants, pigmentary and nonpigmentary dispersants, fillers, standardizers, resins, waxes, defoamers, antidust agents, extenders, shading colorants, preservatives, drying retardants, rheology control additives, wetting agents, antioxidants, such as flame retardants or deflagration inhibitors, UV absorbers, light stabilizers, or a combination thereof.

The addition of auxiliaries may be made at any desired point in time before, during or after the finish or a grinding, or else after isolation, all at once or in a number of portions.

The total amount of the auxiliaries added can be from 0 to 40% by weight, preferably from 1 to 30% by weight, more preferably from 2.5 to 25% by weight, based on the pigment.

Suitable surfactants include anionic or anion-active, cationic or cation-active, and nonionic substances or mixtures of these agents.

Examples of suitable anionic substances include fatty acid taurides, fatty acid N-methyltaurides, fatty acid isethionates, alkylphenylsulfonates, alkylnaphthalene-sulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; soaps, examples being alkali metal salts of fatty acids, naphthenic acids and resin acids, such as abietinic acid, alkali-soluble resins, examples being rosin-modified maleate resins and condensation products based on cyanuric chloride, taurine, N,N'-diethylaminopropylamine and p-phenylenediamine. Particular preference is given to resin soaps, i.e., alkali metal salts of resin acids.

Examples of suitable cationic substances include quaternary ammonium salts, fatty amine oxalates, alkoxylated polyamines, fatty amine polyglycol ethers, fatty amines, diamines and polyamines derived from fatty amines or fatty alcohols, and the alkoxylates of said amines, imidazolines derives from fatty acids, and salts of these cationic substances, such as acetates, for example.

Examples of suitable nonionic substances include amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts and alkylphenyl polyglycol ethers.

By nonpigmentary dispersants are meant substances which in structural terms are not derived from organic pigments by chemical modification. They are added as dispersants either during the actual preparation of pigments or else in many cases during the incorporation of the pigments into the application media to be colored: for example, during the preparation of paints or printing inks by dispersing of the pigments into the corresponding binders. They may be polymeric substances, such as polyolefins, polyesters, polyethers, polyamides, polyimines, polyacrylates, polyisocyanates, block copolymers thereof, copolymers of the corresponding monomers or polymers of one class modified with a few monomers of a different classe. These polymeric substances carry polar anchor groups such as hydroxyl, amino, imino and ammonium groups, carboxylic acid and carboxylate groups, sulfonic acid and sulfonate groups or phosphonic acid and phosphonate groups, for example, and can also be modified with aromatic nonpigmentary substances. Nonpigmentary dispersants may additionally be aromatic substances modified chemically with functional groups but not derived from organic pigments. Nonpigmentary dispersants of this kind are known to the skilled worker and in some cases are available commercially (e.g., Solsperse®, Avecia; Disperbyk®, Byk, Efka®, Efka). A number of types will be mentioned below as representatives; however, it is possible in principle to use any desired other substances described, examples being condensation products of isocyanates and alcohols, diols or polyoles, amino alcohols or diamines or polyamines, polymers of hydroxycarboxylic acids, copolymers of olefin monomers or vinyl monomers and ethylenically unsaturated carboxylic acids and esters, urethane-containing polymers of ethylenically unsaturated monomers, urethane-modified polyesters, condensation products based on cyanuric halides, polymers containing nitroxyl compounds, polyesteramides, modified polyamines, modified acrylic polymers, dispersants with comblike structure formed from polyesters and acrylic polymers, phosphoric esters, polymers derived from triazine, modified polyethers, or dispersants derived from aromatic, nonpigmentary substances. These base structures are in many cases modified further, by means for example of chemical reaction with further substances which carry functional groups, or by formation of salts.

By pigmentary dispersants are meant pigment dispersants which derive from an organic pigment as base structure and are prepared by chemical modification of said base structure; examples include saccharine-containing pigment dispersants, piperidyl-containing pigment dispersants, naphthalene- or perylene-derived pigment dispersants, pigment dispersants containing functional groups linked to the pigment base structure via a methylene group, pigment base structures modified chemically with polymers, pigment dispersants containing sulfo acid groups, sulfonamide groups or sulfo acid ester groups, pigment dispersants containing ether or thioether groups, or pigment dispersants containing carboxylic acid, carboxylic ester or carboxamide groups.

It was surprising that the finish of the invention allows the preparation of dispersible disazo pigments which without such a finish would to date have been difficult if not impossible to disperse after drying. For the preparation of the disazo pigments it is not absolutely necessary in the process of the invention to use auxiliaries.

The use of the disazo pigments of the invention is not restricted to one field of application. When used for coloring high molecular mass organic materials they are distinguished by outstanding performance properties, in particular by very good dispersibility, good rheology, high color strength, excellent bleed fastnesses and overcoating fastnesses, and very good light fastness and weather fastness. Opaque or transparent pigments can be produced as desired, and the hue can be varied.

The pigments prepared by the process of the invention can be used for pigmenting high molecular mass organic materials of natural or synthetic origin, such as plastics, resins, varnishes, paints or electrophotographic toners and developers, and also drawing, writing and printing inks.

Examples of high molecular mass organic materials that can be pigmented with the stated pigments include cellulose ethers and cellulose esters, such as ethylcellulose, nitrocellulose, cellulose acetate or cellulose butyrate, natural resins or synthetic resins, such as addition-polymerization resins or condensation resins, examples being amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures.

It is irrelevant whether the aforementioned high molecular mass organic compounds are in the form of plastic masses, melts or in the form of spinning solutions, varnishes, paints or printing inks. Depending on the intended use it is found advantageous to utilize the pigments obtained in accordance with the invention in the form of a blend or in the form of preparations or dispersions. Based on the high molecular mass organic material to be pigmented, the pigments of the invention are used in an amount of from 0.05 to 30% by weight, preferably from 0.1 to15% by weight.

The pigments prepared in accordance with the invention are also suitable as colorants in electrophotographic toners and developers, such as one- or two-component powder toners (also called one- or two-component developers), magnetic toners, liquid toners, polymerization toners and specialty toners, for example.

Typical toner binders are addition-polymerization resins, polyaddition resins and polycondensation resins, such as styrene, styrene-acrylate, styrene-butadiene, acrylate, polyester and phenyl-epoxy resins, polysulfones, polyurethanes, individually or in combination, and also polyethylene and polypropylene, which may already include, or be modified subsequently with, further ingredient additions, such as charge control agents, waxes, or flow assistants.

The pigments prepared in accordance with the invention are further suited to application as colorants in powders and powder coating materials, particularly in triboelectrically or electrokinetically sprayable powder coating materials which are employed to coat the surfaces of articles made, for example, from metal, wood, plastic, glass, ceramic, concrete, textile material, paper or rubber.

Resins used as powder coating resins are typically epoxy resins, carboxyl- and hydroxyl-containing polyester resins, polyurethane resins and acrylic resins, together with customary curatives. Resin combinations also find use. Thus, for example, epoxy resins are frequently employed in combination with carboxyl- and hydroxyl-containing polyester resins. Typical curative components (depending on the resin system) are, for example, acid anhydrides, imidazoles and also dicyandiamide and its derivatives, blocked isocyanates, bisacrylurethanes, phenolic and melamine resins, triglycidyl isocyanurates, oxazolines and dicarboxylic acids.

The pigments prepared in accordance with the invention are also suitable for use as colorants in ink-jet inks, on both an aqueous and a non aqueous basis, and also in those inks which operate in accordance with the holt-melt process.

Ink-jet inks generally contain a total of from 0.5 to 15% by weight, preferably 1.5 to 8% by weight (calculated on a dry basis) of one or more of the compounds prepared in accordance with the invention.

Microemulsion inks are based on organic solvents, water and, if desired, an additional hydrotropic substance (interface mediator).

Microemulsion inks generally contain from 0.5 to 15% by weight, preferably from 1.5 to 8% by weight, of one of more of the compounds prepared in accordance with the invention, from 5 to 99% by weight of water and from 0.5 to 94.5% by weight of organic solvent and/or hydrotropic compound.

Solvent-based ink-jet inks contain preferably from 0.5 to 15% by weight of one or more compounds prepared in accordance with the invention, from 85 to 99.5% by weight of organic solvent and/or hydrotropic compounds.

Hot-melt inks are generally based on waxes, fatty acids, fatty alcohols or sulfonamides which are solid at room temperature and become liquid on heating, the preferred melting range being situated between about 60° C. and about 140° C. Hot-melt ink-jet inks are composed essentially, for example, of from 20 to 90% by weight of waxes and from 1 to 10% by weight of one or more of the compounds prepared in accordance with the invention. Additionally it is possible for them to contain from 0 to 20% by weight of an additional polymer (as "dye dissolver"), from 0 to 5% by weight of dispersing assistant, from 0 to 20% by weight of viscosity modifier, from 0 to 20% by weight of plasticizer, from 0 to 10% by weight of tack additive, from 0 to 10% by weight of transparency stabilizer (which prevents, for example, crystallization of the waxes) and from 0 to 2% by weight of antioxidant. Typical additives and auxiliaries are described for example in U.S. Pat. No. 5,560,760.

Additionally the pigments prepared in accordance with the invention are also suitable for use as colorants for color filters, for both additive and subtractive color generation, and also for electronic inks.

To assess the properties of the pigments in the plastics field a selection was made, from among the multiplicity of known plastics, of plasticized polyvinyl chloride (PVC).

To assess the properties of the pigments in the printing sector a selection was made, from among the multiplicity of known printing systems, of a gravure printing system based on nitrocellulose (NC).

To assess the properties of the pigments in the coatings sector a selection was made, from among the multiplicity of known varnishes, of an alkyd-melamine resin varnish (AM) based on a medium-oil alkyd resin and on a butanol-etherified melamine resin, of a high-solids acrylic resin stoving varnish based on a non aqueous dispersion (HS), and of an aqueous varnish based on polyurethane (PU).

The color strength and hue were determined in accordance with DIN 55986.

The millbase rheology after dispersion was evaluated visually on the basis of the following five-point scale.
5 high fluid
4 liquid
3 viscous
2 slightly set
1 set The overcoating fastness was determined in accordance with DIN 53221. The viscosity was determined, following dilution of the millbase to the final pigment concentration, using the Rossmann viscospatula type 301 from Erichsen. Gloss measurements took place on cast films from an angle of 20° in accordance with DIN 67530 (ASTMD 523) using the multigloss gloss meter from Byk-Mallinckrodt.

In the examples below, parts and percentages are by weight in each case.

EXAMPLE 1 a) Diazonium Salt Solution 35.5 parts of 6-amino-1H,3H-quinazoline-2,4-dione are heated to boiling in 200 parts by volume of glacial acetic acid, and 60 parts by volume of 31% strength hydrochloric acid are added dropwise. Addition of 800 parts of water is followed by diazotization at from 0 to 5° C. by addition of 26 parts by volume of 40% strength sodium nitrite solution. After 90 minutes of stirring the mixture is made up with water to 2.5 liters. After clarifying filtration excess nitrite is destroyed with aminosulfonic acid.

b) Solution of the Coupling Component 31.7 parts of 2-chloro-1,4-bis(acetoacetylamino)benzene are dissolved in 250 parts of water and 150 parts of ice by adding 24 parts by volume of 33% strength sodium hydroxide solution.

c) Coupling 193.6 parts of 33% sodium hydroxide solution, 100 parts of water and 160 parts of ice are introduced into a vessel and the pH is adjusted to 7-7.5 using glacial acetic acid. The diazonium salt solution is added and a temperature of from 7 to 10° C. is set using ice. The solution of the coupling component is run in over 15 minutes, and then heating takes place over the course of 4.5 hours, with stirring, to a temperature of 98° C. At 80° C. the mixture is filtered and the presscake is washed with water. This gives 507 parts of presscake having a solids content of 13.5%.

d) Finish 147.8 parts of presscake from example 1c) are stirred up in 62.2 parts of water and 190 parts of N-methylpyrrolidone. At 60° C. a pH of 12.3 is set using 7.2 parts of 33% strength sodium hydroxide solution. From a pH of approximately 9.0 the hue of the suspension darkens and in the region of pH 10.5 it changes from yellow to orange. The suspension is stirred under reflux for 5 hours and then adjusted to a pH of 1.5 using 31% strength hydrochloric acid. The hue changes to greenish yellow. The suspension is filtered and the filter product is washed with 50% strength aqueous N-methylpyrrolidone and then with water and is dried at 80° C. This gives 16.4 parts of pigment which in the AM varnish gives transparent colorations with a yellow hue.

EXAMPLE 2 a) Diazonium Salt Solution 29.8 parts of 5-aminobenzimidazolone are stirred up in 60 parts by volume of 31% strength hydrochloric acid and 500 parts of water at 50° C. After cooling to 5-10° C., diazotization is carried out by adding 26 parts by volume of 40% strength sodium nitrite solution. After 1 hour of stirring the mixture is made up with water to a volume of 2.5 liters and, after clarifying filtration, excess nitrite is destroyed with amidosulfonic acid.

b) Solution of the Coupling Component 27.6 parts of 1,4-bis(acetoacetylamino)benzene are dissolved in 400 parts of water by adding 30 parts by volume of 33% strength sodium hydroxide solution. Following the addition of 160 parts of ice, precipitation is carried out by adding 40 parts by volume of 50% acetic acid.

c) Coupling 193.6 parts of 33% strength sodium hydroxide solution, 100 parts of water and 160 parts of ice are introduced into a vessel and the pH is adjusted to 7-7.5 using glacial acetic acid. The diazonium salt solution is added and a temperature of from 7 to 10° C. is set using ice. The suspension of the coupling component is run in over 35 minutes, and then heating takes place over the course of 7 hours, with stirring, to a temperature of 98° C. At 80° C. the suspension is filtered and the presscake is washed with water. This gives 324 parts of presscake having a solids content of 19%.

d) Finish 105.5 parts of presscake from example 2c) are stirred up in 104.5 parts of water and 190 parts of N-methylpyrrolidone. At 60 to 65° C. a pH of 12.4 is set using 6.7 parts of 33% strength sodium hydroxide solution and the hue of the suspension changes from yellow to orange. After 5 hours of stirring under reflux, the pH is adjusted to 1.5 using 31% strength hydrochloric acid and the hue changes to reddish yellow. The suspension is filtered and the filter product is washed with 50% strength N-methylpyrrolidone and then with water and is dried at 80° C. This gives 11 parts of pigment which in the AM varnish gives hiding coatings with a strong orange color. The overcoating fastness is faultless. In NC printing, strongly colored, glossy prints are obtained.

COMPARATIVE EXAMPLE 1

The chromophore from example 2 was prepared in accordance with DE 24 51 097, example 64.

Comparison of Example 2d) with Comparative Example 1

The coatings in the AM varnish of the pigment from example 2d) are, compared with those of comparative example 1, much more strongly colored, more hiding, and redder. The rheology is evaluated as being 3, the viscosity is 3.4 sec, the gloss of a drawdown has a value of 78 and the gloss of a cast coating has a value of 80. In the case of comparative example 1 the rheology is evaluated as being 1, the viscosity is unmeasurable (excessive bodying), and the coatings are so matt that no gloss is measurable on either drawdowns or casts.

EXAMPLE 3 a) Diazonium Salt Solution: from Example 2a)

b) Solution of the Coupling Component: from Example 1 b)

c) Coupling 193.6 parts of 33% strength sodium hydroxide solution, 100 parts of water and 160 parts of ice are introduced into a vessel and the pH is adjusted to 7-7.5 using glacial acetic acid. The diazonium salt solution is added and a temperature of from 7 to 10° C. is set using ice. The suspension of the coupling component is run in over 15 minutes and then heating takes place over the course of 3.5 hours, with stirring, to a temperature of 98° C. At 80° C. the suspension is filtered and the presscake is washed with water. This gives 735 parts of presscake having a solids content of 8.4%.

d) Alkali Finish 238 parts of presscake from example 3c) are stirred up in 218 parts of N-methylpyrrolidone. At 60° C. a pH of 12.4 is set using 4.4 parts of 33% strength sodium hydroxide solution, and from a pH of 10 the hue of the suspension darkens markedly. After 5 hours of stirring under reflux, the pH is adjusted to 1.5 using 31% strength hydrochloric acid, and the hue becomes bright and orange again. The suspension is filtered and the filter product is washed with 50% strength N-methylpyrrolidone and then with water and is dried at 80° C. This gives 19.3 parts of pigment, which in the AM varnish gives hiding coatings with a strong orange color.

e) Neutral Finish 238.1 parts of presscake from example 3c) are suspended in 71.9 parts of water and 290 parts of N-methylpyrrolidone and the suspension is stirred at 105° C. for 5 hours. After cooling, the suspension is filtered and the filter product is washed with 50% strength N-Methylpyrrolidone and then with water and is dried at 80° C. This gives 15.6 parts of pigment, which in the AM varnish gives hiding coatings with a strong orange color.

COMPARATIVE EXAMPLE 2

The chromophore from example 3 was prepared in accordance with DE 24 51 097, example 1, by using 5-aminobenzimidazolone as the base and 2-chloro-1,4-bis(acetoacetylamino)benzene as the coupling component.

Comparison of Example 3d) with Comparative Example 2

The coatings in the AM varnish of the pigment from example 3d) are, compared with those of comparative example 2, much more strongly colored and redder. The viscosity is 3.6 sec, the drawdown gloss has a value of 70 and the cast gloss has a value of 72. In the case of comparative example 2 the viscosity is 9.0 sec, the drawdown gloss has a value of only 32 and in cast form the varnish is so matt that no gloss is any longer measurable.

Comparison of Example 3e) with Comparative Example 2

The coatings in the AM varnish of the pigment from example 3e) are, compared with those of comparative example 2, much more strongly colored and redder and markedly more hiding. The viscosity is 5.8 sec, the drawdown gloss has a value of 71 and the cast gloss has a value of 19. In the case of comparative example 2, the viscosity is 9.0 sec, the drawdown gloss has a value of only 32 and in cast form the varnish is so matt that no gloss is any longer measurable.

EXAMPLE 4 a) Diazonium Salt Solution: from Example 1a)

b) Solution of the Coupling Component: from Example 2b)

c) Coupling 193.6 parts of 33% strength sodium hydroxide solution, 100 parts of water and 160 parts of ice are introduced into a vessel and the pH is adjusted to 7-7.5 using glacial acetic acid. The diazonium salt solution is added and a temperature of from 7 to 10° C. is set using ice. The suspension of the coupling component is run in over 30 minutes and then heating takes place over the course of 3 hours, with stirring, to a temperature of 98° C. At 80° C. the suspension is filtered and the presscake is washed with water. This gives 472.2 parts of presscake having a solids content of 12.7%.

d) Finish 157.5 parts of presscake from example 4c) are stirred up in 52.5 parts of water and 190 parts of N-methylpyrrolidone. At 60° C. a pH of 12.5 is set using 7.6 parts of 33% strength sodium hydroxide solution and the hue of the suspension changes from greenish yellow to reddish yellow. After 5 hours of stirring under reflux, the pH is adjusted to 2 using 31% strength hydrochloric acid and the shade changes to greenish yellow. The suspension is filtered and the filter product is washed with 50% strength aqueous N-methylpyrrolidone and then with water and is dried at 80° C. This gives 16.5 parts of pigment which in the AM varnish gives transparent colorations with a yellow hue.

EXAMPLE 5 a) Diazonium Salt Solution 41.4 parts of 6-amino-7-methoxyquinoxaline-2,3-dione are stirred in 500 parts of water and 60 parts by volume of 31% strength hydrochloric acid. At from 0 to 5° C. diazotization is carried out by addition of 26 parts by volume of 40% strength sodium nitrite solution. After 45 minutes of stirring and subsequent clarifying filtration excess nitrite is destroyed with aminosulfonic acid.

b) Solution of the Coupling Component: from Example 1b)

c) Coupling 193.6 parts of 33% sodium hydroxide solution, 100 parts of water and 160 parts of ice are introduced into a vessel and the pH is adjusted to 7-7.5 using glacial acetic acid. The diazonium salt solution is added and a temperature of 7° C. is set using ice. The solution of the coupling component is run in over 15 minutes, and then heating takes place over the course of 2.5 hours, with stirring, to a temperature of 98° C. At 80° C. the mixture is filtered and the presscake is washed with water. This gives 641.7 parts of presscake having a solids content of 11.2%.

d) Alkali Finish 178.9 parts of presscake from example 5c) are stirred up in 31.1 parts of water and 190 parts of N-methylpyrrolidone. At 60° C. a pH of 12.2 is set using 7.3 parts of 33% strength sodium hydroxide solution. From a pH of approximately 9.0 the hue of the suspension darkens and in the region of pH 11 it changes from orange to red-brown. The suspension is admixed with 40 parts by volume of 50% strength N-methylpyrrolidone and stirred under reflux for 5 hours and then adjusted to a pH of 1.5 using 31% strength hydrochloric acid. The hue changes to reddish yellow. The suspension is filtered and the filter product is washed with 50% strength aqueous N-methylpyrrolidone and then with water and is dried at 80° C. This gives 19.1 parts of pigment which in the AM varnish gives hiding colorations with a yellow hue.

e) Neutral Finish 178.9 parts of presscake from example 5c) are suspended in 131.1 parts of water and 290 parts of N-methylpyrrolidone and the suspension is stirred at 105° C. for 5 hours. After cooling, the suspension is filtered and the filter product is washed with 50% strength N-Methylpyrrolidone and then with water and is dried at 80° C. This gives 19.4 parts of pigment, which in the AM varnish gives transparent coatings which are reddish yellow.

COMPARATIVE EXAMPLE 3

The chromophore from example 5 was prepared in accordance with DE 24 51 097, example 1, by using 6-amino-7-methoxyquinoxaline-2,3-dione as the base and 2-chloro-1,4-bis(acetoacetylamino)benzene as the coupling component.

Comparison of Example 5d) with Comparative Example 3

The coatings in the AM varnish of the pigment from example 5d) are, compared with those of comparative example 3, much more strongly colored and brighter, substantially more hiding, and also greener and cleaner. The viscosity is 3.8 sec, the drawdown gloss has a value of 69 and the cast gloss has a value of 69. In the case of comparative example 3 the viscosity is 4.3 sec, the drawdown gloss has a value of only 27 and the cast gloss has a value of only 15.

Comparison of Example 5e) with Comparative Example 3

The coatings in the AM varnish of the pigment from example 5e) are, compared with those of comparative example 3, much more strongly colored and, much brighter, somewhat more hiding, and also greener. The drawdown gloss has a value of 51 and the cast gloss has a value of 38. In the case of comparative example 3, the drawdown gloss has a value of only 27 and the cast gloss has a value of only 15.

EXAMPLE 6 a) Diazonium Salt Solution 103.5 parts of 6-amino-7-methoxyquinoxaline-2,3-dione are stirred in 1250 parts of water and 150 parts by volume of 31% strength hydrochloric acid. At from 0 to 5° C. diazotization is carried out by adding 100 parts by volume of 5N sodium nitrite solution. After 90 minutes of stirring and subsequent clarifying filtration excess nitrite is destroyed with aminosulfonic acid.

b) Solution of the Coupling Component 69 parts of 1,4-bis(acetoacetylamino)benzene are dissolved in 1000 parts of water by adding 75 parts by volume of 33% strength sodium hydroxide solution. Following the addition of 400 parts of ice, precipitation is carried out by adding 100 parts by volume of 50% strength acetic acid.

c) Coupling 484 parts of 33% strength sodium hydroxide solution, 250 parts of water and 400 parts of ice are introduced into a vessel and the pH is adjusted to 6.9-7.0 using glacial acetic acid. The diazonium salt solution is added along with 50 parts by volume of a 10% strength aqueous solution of a fatty alcohol polyglycol ether, prepared from a saturated $C_{16}$-$C_{18}$ alcohol by reaction with 25 equivalents of ethylene oxide. The suspension of the coupling component is run in over 75 minutes, and then the mixture is stirred at 95-98° C. for 3 hours. At 80° C. the mixture is filtered and the presscake is washed with water. This gives 1110 parts of presscake having a solid content of 16.8%.

d) Alkali Finish, Organic Solvent 89.1 parts of presscake from example 6c) and 0.4 part of solid sodium hydroxide are stirred up in 333.3 parts of N-methylpyrrolidone. The mixture is then heated to 180° C., in the course of which water is removed by distillation. After 5 hours of stirring at 180° C. it is cooled to 100° C. and a pH of 1.5 is set by adding 31% strength hydrochloric acid. After 15 minutes of stirring at 100° C. the suspension is filtered and the filter product is washed with 50% strength N-methylpyrrolidone and then with water and is dried at 80° C. This gives 11 parts of pigment, which in the AM varnish gives coatings with a strong reddish yellow color.

e) Alkali Finish, Room Temperature, Aqueous-Organic Solvent 100 parts of presscake from example 6c) are stirred up in 220 parts of water, 340 parts of N-methylpyrrolidone and 13 parts of solid sodium hydroxide. The color changes from orange to brown and further to yellow. The suspension is stirred at room temperature for about 70 hours. The pH is adjusted to 1.5 using 31% strength hydrochloric acid and then the suspension is filtered and the filter product is washed with 50% strength N-methylpyrrolidone and then with water and is dried at 80° C. This gives 15.5 parts of pigment, which in the AM varnish gives strongly colored transparent coatings with a clean orange hue.

f) Alkali Finish, Aqueous-Organic Solvent 120.1 parts of presscake from example 6c) are stirred up in 175.6 parts of water. A pH of 11 is set using 0.47 part of solid sodium hydroxide. Following the addition of 275.7 parts of isobutanol the mixture is stirred under pressure at 150° C. for 10 hours. After cooling a pH of 1.5 is set using 31% strength hydrochloric acid. Then it is stirred under reflux for 1 hour, after which the alcohol is removed by passing steam through the mixture. Filtration and washing of the filter product with water are followed by drying at 80° C. This gives 18.2 parts of pigment, which in the AM varnish gives coatings with a strong yellow color.

g) Alkali Finish, Aqueous-Organic Solvent 100 parts of presscake from example 6c) are stirred up in 191.4 parts of water and 274.8 parts of N-methylpyrrolidone. A pH of 11.1 is set using 1.42 parts of 33% strength sodium hydroxide solution. The mixture is stirred at 130° C. under pressure for 12 minutes. After cooling to 50° C. a pH of 1.5 is set using 31% strength hydrochloric acid. Filtration and washing of the filter product with water are followed by drying at 80° C. This gives 16.5 parts of pigment, which in the AM varnish gives coatings with a strong reddish yellow color.

h) Alkali Finish, Aqueous-Organic Solvent 118.8 parts of presscake from example 6c) are stirred up in 221 parts of water and 340 parts of N-methylpyrrolidone.

A pH of 10.8 is set using 0.56 part of solid sodium hydroxide. The mixture is stirred at 170° C. under pressure for 5 hours. After cooling to 50° C. a pH of 1.5 is set using 31% strength hydrochloric acid. Filtration and washing of the filter product with 50% strength, N-methylpyrrolidone and water are followed by drying at 80° C. This gives 16.6 parts of pigment, which in the AM varnish gives coatings with a strong yellow color.

i) Alkali Finish, Aqueous-Organic Solvent 120.1 parts of presscake from example 6c) are stirred up in 175.6 parts of water and 275.7 parts of N-methylpyrrolidone. Then over the course of 12 hours a total of 2.8 parts of solid sodium hydroxide, in portions, are added, during which the mixture is stirred under reflux. A pH of 1.5 is then set using 31% strength hydrochloric acid and the mixture is stirred under reflux for 15 minutes, cooled and then filtered, and the filter product is washed with 50% strength N-methylpyrrolidone and with water and is dried at 80° C. This gives 19.4 parts of pigment, which in the AM varnish gives coatings with a strong orange color.

k) Neutral Finish, Aqueous-Organic Solvent 118.8 parts of presscake from example 6c) are stirred up in 221 parts of water and 340 parts of N-methylpyrrolidone. Without adding alkali, the mixture is stirred under pressure at 170° C. for 5 hours. After cooling, it is filtered and the filter product is washed with 50% strength N-methylpyrrolidone and with water and is dried at 80° C. This gives 17 parts of pigment, which in the AM varnish gives coatings with a strong reddish yellow color.

COMPARATIVE EXAMPLE 4

The chromophore from example 6 was prepared in accordance with DE 24 51 097, example 1, by using 6-amino-7-methoxyquinoxaline-2,3-dione as the base and 1,4-bis(acetoacetylamino)benzene as the coupling component.

Comparison of Comparative Example 4 with Example 6h)

The coatings in the AM varnish of the pigment from comparative example 4 are, compared with those of example 6h, much less strongly colored and redder, and substantially more transparent. The drawdown gloss has a value of only 31 and the cast gloss has a value of only 22. The coatings of example 6h) are much more glossly: the drawdown gloss has a value of 77 and the cast gloss have a value of 76.

Comparason of Comparative Example 4 with Example 6i)

The coatings in the AM varnish of the pigment from comparative example 4) are, compared with those of comparative example 6i), much less strongly colored more transparent and yellower. The drawdown gloss has a value of only 31 and the cast gloss has a value of only 22. The coatings of example 6i) are much more glossy: the gloss both of drawdowns and of casts has a value of 64.

Comparison of Comparative Example 4 with Example 6k)

The coatings in the AM varnish of the pigment from comparative example 4 are, compared with those of example 6k, much less strongly colored and substantially redder and much more transparent. The drawdown gloss has a value of only 31 and the cast gloss has a value of only 22. The coatings of example 6k) are much more glossy: the drawdown gloss has a value of 61 and the cast gloss has a value of 52.

COMPARATIVE EXAMPLE 5

The chromophore from example 2 was prepared in accordance with DE-A-42 29 207, example 29.

Comparison of Comparative Example 5 with Example 2d):

The pigments prepared in accordance with example 2d) and comparative example 5 were incorporated into a PVC plastic. The colorations of example 2d) are strongly colored with a clean reddish yellow hue. The pigment from comparative example 5 is not dispersed, and all that can be seen are black specks. The PVC is not colored. The pigment is completely unsuitable for coloring PVC. Both pigments were compared in an AM varnish. The pigment from comparative example 5 shows a dark, cloudy masstone and is significantly weaker in color than the pigment from example 2d), which gives a clean, bright masstone.

What is claimed is:

1. A process for preparing a disazo pigment or a mixture of disazo pigments of the formula (I) by azo coupling

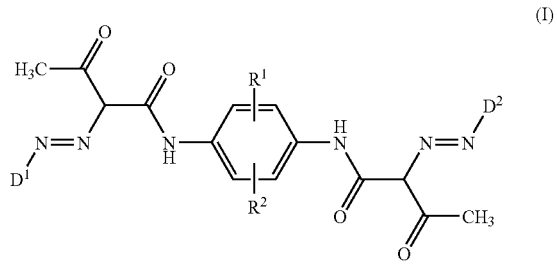

wherein,
R$^1$ and R$^2$ are identical or different and are hydrogen, C$_1$-C$_4$ alkyl, C$_1$-C$_4$ alkoxy, C$_1$-C$_5$ alkoxycarbonyl, nitro, cyano, halogen, phenoxy or trifluoromethyl;
D$^1$ and D$^2$ are identical or different and are an aromatic heterocycle selected from the group consisting of benzimidazole, benzimidazolone, benzimidazolethione, benzoxazole, benzoxazolone, benzothiazolone, indazole, phthalimide, naphthalimide, benzotriazole, quinoline, benzodiazines, phenmorpholine, phenmorpholinone, benzo[c,d]indolone, benzimidazo[1,2-a]pyrimidone, carbazole and indole, said heterocycles being unsubstituted or substituted by 1, 2, 3 or 4 identical or different radicals selected from the group consisting of halogen, C$_1$-C$_4$ alkyl, acetamido, carbomethoxyamino, C$_1$-C$_4$ alkoxy, nitro, phenyl, phenoxy and trifluoromethyl, wherein the phenyl radical is optionally substituted by chioro, methyl or methoxy, and wherein the heterocycle is attached directly or via a phenylene group to the azo group in formula (I),
comprising the step of subjecting the azo coupling product to a finish in at least one organic solvent in the presence of a base selected from the group consisting of alkali metal hydroxides and alkali metal alkoxides, or in an aqueous solution containing the at least one organic solvent, at alkali pH≧9.

2. The process as claimed in claim 1, wherein R$^1$ and R$^2$ are identical or different and are hydrogen, methyl, ethyl, methoxy, ethoxy, propoxy, butoxy, fluoro, chioro, bromo, cyano, nitro, methoxycarbonyl, ethoxycarbonyl or trifluoromethyl.

3. The process as claimed in claim 1, wherein the aromatic heterocycle is a benzimidazolone, phthalimide, naphthalimide, quinazoline, quinazolinone, quinazolinedlone, phthalazlne, phthalazinone, phthalazinedione, quinoxaline, quinoxalinone or quinoxalinedione.

4. The process as claimed in claim 1, wherein the heterocycles $D^1$ and $D^2$ are unsubstituted or substituted by 1, 2 or 3 identical or different radicals selected from the group consisting of methyl, ethyl, methoxy, ethoxy, nitro, fluoro, chioro, bromo, phenyl and trifluoromethyl.

5. The process as claimed in claim 1, wherein the azo coupling product is in the form of a presscake, granules or a powder.

6. The process as claimed in claim 1, wherein the subjecting step is performed on a suspension containing from 1 to 50% by weight of the azo coupling product, based on the total weight of the suspension.

7. The process as claimed in claim 1, wherein the at least one organic solvent is selected from the group consisting of an alcohol having 1 to 20 carbon atoms, a glycol, glycerol, a polyglycol, an ether, a glycol ether, a ketone, an aliphatic acid amide, a urea derivative, a cyclic carboxamide, an ester of an aliphatic or aromatic carboxylic acid, a nitriles, an aliphatic, an aromatic or araliphatic hydrocarbon, an alkyl-, alkoxy-, nitro-, and/or halogen-substituted benzene, an aromatic heterocycle, hexamethyiphosphoramide, 1,3-dimetyl-2-imidazolidinone; a sulfone, a sulfoxide; and mixtures thereof.

8. The process as claimed in claim 1, wherein the at least one organic solvent is a $C_1$-$C_6$ alcohol, dimethylformamide, N,N-dimethylacetamide, N-methylpyrrolidone dimethyisulfoxide, or mixtures thereof.

9. The process as claimed in claim 1, wherein the aqueous solution contains from 2.5 to 95% by weight of the at least one organic solvent.

10. The process as claimed in claim 1, wherein the subjecting step occurs at an alkali pH of greater than 9.5.

11. The process as claimed in claim 1, wherein the subjecting step is carried out at a temperature of between 0 and 250° C.

12. The process as claimed in claim 1, wherein the subjecting step is carried out for a time of from 5 minutes to 96 hours.

13. The process as claimed in claim 1, further comprising the step of adding an acid after the subjecting step at alkali pH.

14. The process as claimed In claim 1, wherein the subjecting step is performed on a suspension containing from 2 to 20% by weight of the azo coupling product, based on the total weight of the suspension.

15. The process as claimed in claim 1, wherein the subjecting step is performed on a suspension containing from 3 to 17.5% by weight of the azo coupling product, based on the total weight of the suspension.

16. The process as claimed in claim 1, wherein the at least one organic solvent is methanol, ethanol, isopropanol, isobutanol, tert.-butanol or tert.-amyl alcohol, butyl glycol or a mixture thereof.

17. The process as claimed in claim 1, wherein the aqueous solution contains from 5 to 90% of the at least one organic solvent.

18. The process as claimed in claim 1, wherein the subjecting step is carried out at a temperature of between 150 and 200° C.

19. A process for preparing a disazo pigment or a mixture of disazo pigments of the formula (I) by azo coupling

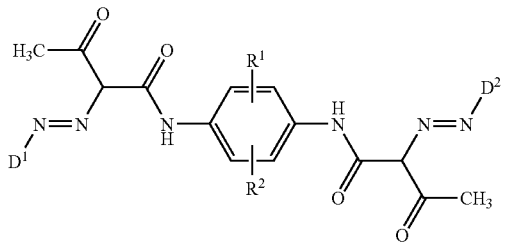

(I)

wherein,
  $R^1$ and $R^2$ are identical or different and are hydrogen, $C_1$-$C_4$ alkyl, $C_1$-$C_4$ alkoxy, $C_1$-$C_5$ alkoxycarbonyl, nitro, cyano, halogen, phenoxy or trifluoromethyl;
  $D^1$ and $D^2$ are identical or different and are an aromatic heterocycle selected from the group consisting of benzimidazole, benzimidazolone, benzimidazolethione, benzoxazole, benzoxazolone, benzothiazolone, indazole, phthalimide, naphthalimide, benzotriazoie, quinoline, benzodiazines, phenmorpholine, phenmorpholinone, benzo[c,d]indolone, benzimidazo[1,2-a]pyrimidone, carbazole and indole, said heterocycles being unsubstituted or substituted by 1, 2, 3 or 4 identical or different radicals selected from the group consisting of halogen, $C_1$-$C_4$ alkyl, acetamido, carbomethoxyamino, $C_1$-$C_4$ alkoxy, nitro, phenyl, phenoxy and trifluoromethyl, wherein the phenyl radical is optionally substituted by chloro, methyl or methoxy, and wherein the heterocycle is attached directly or via a phenylene group to the azo group in formula (I),
  comprising the step of subjecting the azo coupling product to a finish in at least one organic solvent in the presence of a base selected from the group consisting of alkali metal hydroxides and alkali metal alkoxides.

20. A process for preparing a disazo pigment or a mixture of disazo pigments of the formula (I) by azo coupling

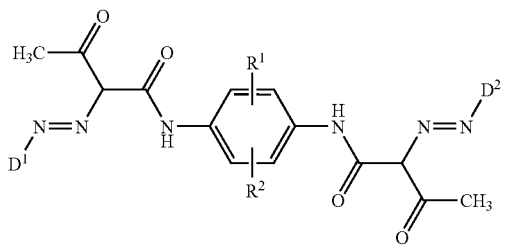

(I)

wherein,
  $R^1$ and $R^2$ are identical or different and are hydrogen, $C_1$-$C_4$ alkyl, $C_1$-$C_4$ alkoxy, $C_1$-$C_5$ alkoxycarbonyl, nitro, cyano, halogen, phenoxy or trifluoromethyl;
  $D^1$ and $D^2$ are identical or different and are an aromatic heterocycle selected from the group consisting of benzimldazole, benzimidazolone, benzimidazolethione, benzoxazole, benzoxazolone, benzothiazolone, indazole, phthalimide, naphthalimide, benzotriazole, quinoline, benzodiazines, phenmorpholine, phenmorpholi none, benzo[c,d]indolone, benzimidazo[1,2-a]pyrimidone, carbazole and indole, said heterocycles being unsubstituted or substituted by 1, 2, 3 or 4 identical or different radicals selected from the group consisting of halogen, $C_1$-$C_4$ alkyl, acetamido, carbomethoxyamino, $C_1$-$C_4$ alkoxy, nitro, phenyl, phenoxy and trifluoromethyl, wherein the phenyl radical is optionally substituted by chloro, methyl or methoxy, and wherein the heterocycle is attached directly or via a phenylene group to the azo group in formula (I), comprising the step of subjecting the azo coupling product to a finish in an aqueous solution containing at least one organic solvent, at alkali pH$\geqq$9.

* * * * *